United States Patent [19]
Berberich et al.

[11] Patent Number: 6,141,858
[45] Date of Patent: Nov. 7, 2000

[54] HEAD SUSPENSION LIFT CAM ADJUSTMENT

[75] Inventors: James William Berberich, San Jose; Neal Bertram Schirle, Morgan Hill, both of Calif.

[73] Assignee: International Business Machines Corporation, Armonk, N.Y.

[21] Appl. No.: 09/149,888

[22] Filed: Sep. 8, 1998

Related U.S. Application Data

[62] Division of application No. 08/886,767, Jul. 2, 1997, Pat. No. 6,057,988.
[51] Int. Cl.[7] .................................................. G11B 5/42
[52] U.S. Cl. ........................................ 29/603.03; 360/105
[58] Field of Search ................. 29/603.03; 360/104–106, 360/98.07

[56] References Cited

U.S. PATENT DOCUMENTS

| | | | |
|---|---|---|---|
| 5,148,339 | 9/1992 | Yoshida | 360/105 |
| 5,289,325 | 2/1994 | Morehouse et al. | 360/105 |
| 5,422,770 | 6/1995 | Alt | 360/105 |

FOREIGN PATENT DOCUMENTS

| | | |
|---|---|---|
| 6-005021 | 1/1994 | Japan . |
| 6-005022 | 1/1994 | Japan . |
| WO96/36045 | 5/1996 | WIPO . |

*Primary Examiner*—Carl E. Hall
*Attorney, Agent, or Firm*—Noreen A. Krall; Abdy Raissinia

[57] ABSTRACT

A method and apparatus for adjusting the height of a set of load/unload lift cams with respect to the axial height of an associated stack of disks. The method steps comprise supporting load/unload lift cams with an adjustment tool, measuring the relative height of the load/unload lift cams with respect to the stack of disks in the axial direction with a non-contact transducer, and fixing the load/unload lift cams at a registered height with respect to the stack of disks.

10 Claims, 5 Drawing Sheets

HEAD SUSPENSION LIFT CAM ADJUSTMENT

This is a Divisional application of Ser. No. 08/886,767, filed Jul. 2, 1997, now U.S. Pat. No. 6,057,988.

TECHNICAL FIELD

This invention relates to magnetic disk file head suspension load/unload, and, more particularly, to the adjustment of the head suspension lift cams in the disk axial direction.

BACKGROUND OF THE INVENTION

Head load/unload has been used primarily for removable flexible magnetic disk drives, removable cartridge magnetic disk drives, and portable computer magnetic disk products.

The removable flexible magnetic disk products and removable cartridge magnetic disk products must use head load/unload to remove the head(s) from the disk so that the removable flexible magnetic disk cassette and the removable hard magnetic disk cartridge may be removed from the disk drive. The removable flexible and hard disks are typically low capacity, low performance products, and typically employ a single disk. Thus, the head load/unload requirements are not critical and considerable tolerance is allowed.

Portable computer magnetic disk products are concerned about the potential for "head slap", which may be caused by external shock, e.g., when the computer for housing the disk drive or the disk drive is bumped or dropped. As the result of the external shock, the head slider momentarily lifts from the rest position on the disk and bounces back down on to the surface of the disk. The impact of the head slider on the disk can cause permanent deformation in localized areas of the disk where the slider edge or corner hits the disk, also referred to as "disk dings".

Portable disk drives are normally low capacity, low performance disk drives, having low disk spindle speeds (3600 to 4500 rpm), small disks (2.5" or 1.8" form factors) and a small number of disks (1 to 3). Such portable disk drives are typically designed to allow for low precision and high tolerances.

High end disk drives are having difficulty meeting the conflicting requirements of slider start/stop durability and stiction as fly heights necessarily are reduced to accommodate the need for increased data recording density. Head slider load/unload is one method for relieving these problems. Thus, head Load/unload may become widely used in the industry to enable increased recording density with reliable start/stop.

The required high capacities typically require designs to maximize the number of disks in a stack and to reduce the disk spacing as much as possible. Since the heads are positioned between the disks, the head suspensions must be designed to be close to the disk surfaces and thin in vertical dimensions in order to fit between the disks. Thus, head suspension load/unload lift cams for high end disk drives must also be designed to fit between the disks and be close to the surface of the disks. These design requirements, in turn, require high precision and close manufacturing tolerances.

The manufacturing tolerance contributors in the disk to load/unload ramp relative position include ramp base plate to spindle vertical location tolerances, hub to shaft tolerances, and contributors that add to spindle tilt (relative to the base plate).

Variation in the positioning of the load/unload ramps in the vertical direction (the direction of the axis of the stack of disks) also affects the usable amount of recording real estate on the surface of the disks. Specifically, variation in the relative vertical position of the suspension lift location at the ramp varies the horizontal position of the point on the ramp where the slider lifts off the disk. Thus, there is a corresponding variation in the radial position on the disk where the slider lifts off the disk. This variation must be accounted for and results in a radial band on the disk which can be called the load/unload zone. Reducing the variation in the relative vertical positions of the ramp with respect to the disk reduces the variation in the vertical location of the point of the ramp that the suspension contacts and, in turn, reduces the radial width of the load/unload zone on the disk and thus leaves more room for data storage on the disk. This variation must be reduced in order to reduce the size of the landing zone on the disk and thereby increase the size of the recordable recording surface on the disk.

Adjustable load/unload lift cams have been employed for single removable floppy disks or removable hard disk cartridges.

An example is illustrated in PCT Published Application WO 96/36045. The vertical adjustment provided is not precise and comprises sliding inclined surfaces. The adjustment is appropriate to the lack of precision required for removable floppy disks or removable hard disk cartridges, and no tool is provided to accomplish a precision adjustment.

What is needed is a means to compensate for the accumulated manufacturing tolerances in positioning of the load/unload lift cam ramps.

SUMMARY OF THE INVENTION

Disclosed are a method, apparatus, and a disk file for adjusting the height of a set of load/unload lift cams with respect to the axial height of an associated stack of disks. The method steps comprise supporting load/unload lift cams with an adjustment tool, measuring the relative height of the load/unload lift cams with respect to the stack of disks in the axial direction with a non-contact transducer, and fixing the load/unload lift cams at a registered height with respect to the stack of disks.

For a fuller understanding of the present invention, reference should be made to the following detailed description taken in conjunction with the accompanying drawings.

DETAILED DESCRIPTION OF THE INVENTION

Figure 1:
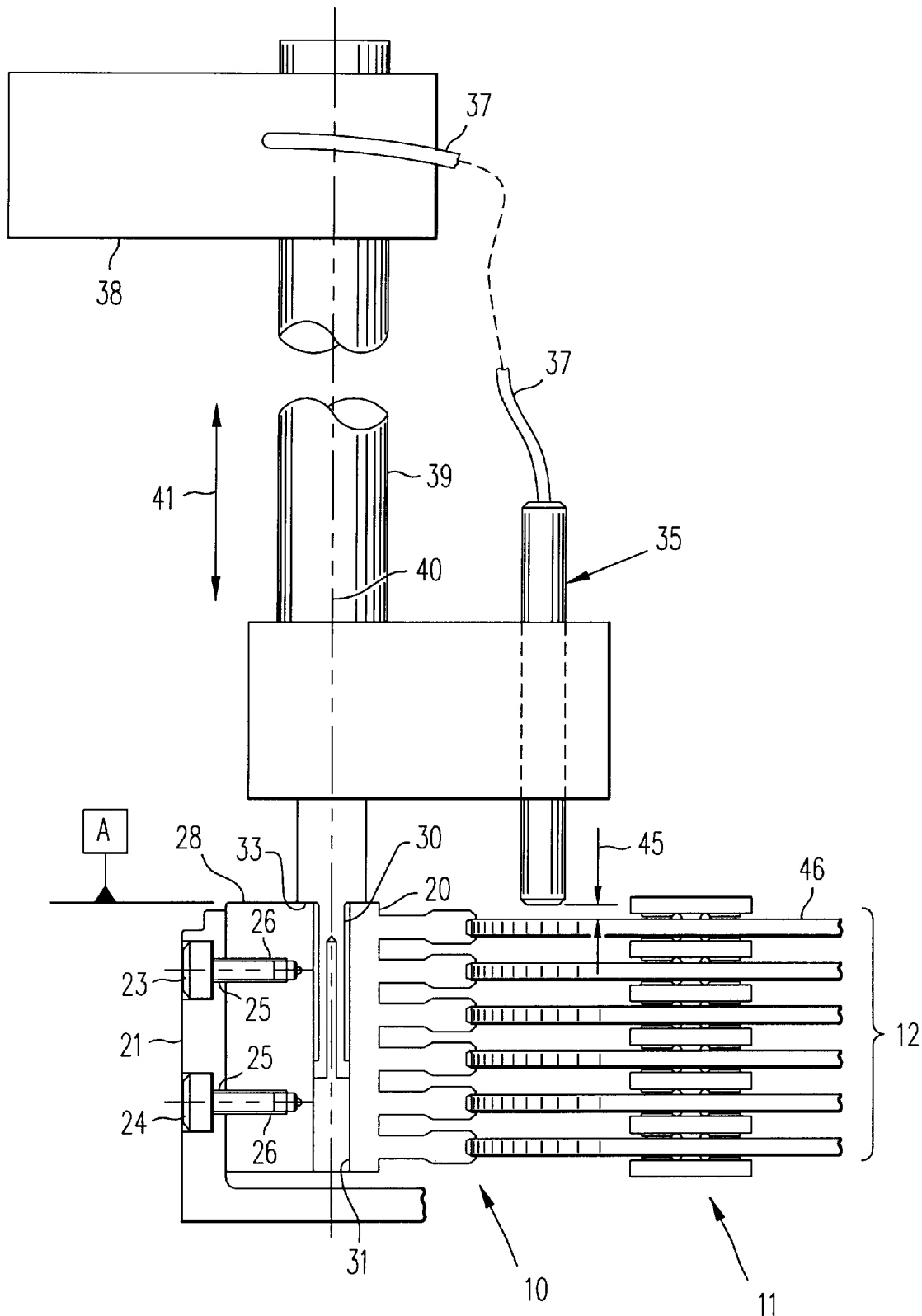
FIG. 1 is an illustration of a load/unload lift cam arrangement and adjustment tool of the present invention.

Referring to FIG. 1, a set of load/unload lift cams 10 are illustrated for loading and unloading a corresponding set of head and suspension assemblies 11 from the corresponding recording surfaces of a stack of magnetic recording disks 12.

As discussed above, head load/unload is likely to be used widely in high end disk drives in order to meet the conflicting requirements of slider start/stop durability and stiction as fly heights necessarily are reduced to increase the data recording density. The high capacity requirements of high end drives are requiring both increased recording densities, but also requiring that the number of recording disks be maximized in the given form factor heights. Thus, the disks must be placed as close together as possible. To allow close placement of the disks, the head and suspension assemblies must be both thin in the vertical dimension and positioned close to the disk surface. The load/unload lift cams must therefore be precisely positioned in the axial direction with respect to the disk surfaces in order to be able to perform the load/unload function and maintain the low spacing between disks.

In order to achieve high capacity, the maximum amount of disk surface must be utilized for recording. Variation in the relative vertical position of the suspension lift location at the load/unload ramp with respect to the corresponding disk surface varies the horizontal position of the point on the ramp where the slider lifts off the disk.

As discussed above, the high capacity requirements of high end disk drives requires any adjustment to be with a high degree of precision.

FIG. 1 illustrates an embodiment of a high precision adjustable load/unload lift cam arrangement in accordance with the present invention. A set of load/unload lift cams 10 may be formed in common or may be assembled from separate parts and includes a carrier 20. A base plate member or wall 21 is provided and may form part of the base plate for the disk drive, or may be fixedly attached to the disk drive base plate. Screws 23 and 24 are inserted through holes 25 in base plate wall 21 into threaded holes 26 in carrier 20. Holes 25 are larger than the screws 23 or 24 so as to allow vertical movement of carrier 20 when the screws are not tightened.

The carrier 20 of the load/unload lift cam assembly 10 is provided with a registration surface 28 which is precisely located vertically at a registration line A with respect to the vertical positions of the set of load/unload lift cams 10.

Note that in FIGS. 1, 2, 3, 3a, 3b and 3c the head suspension assemblies are not shown supported by the lift cams as they would be during the assembly process. Rather, for reasons of clarity and simplicity in the diagrams, the head suspensions are shown over the disks as they would be during operation of a disk drive.

FIG. 1 also illustrates an embodiment of a precision tool for adjusting the vertical height of the load/unload lift cams 10 at registration line A with respect to the height of the stack of disks 12 in accordance with the present invention.

The tool comprises an expandable clamp 30 which is inserted into a corresponding hole 31 in the carrier 20 of the load/unload lift cam assembly 10. The tool has a registration surface 33, and the clamp 30 is inserted into hole sufficiently that registration surface 33 registers with registration surface 28 of the carrier 20 of the load/unload lift cams 10.

The tool comprises a non-contact measurement transducer 35 which is precisely positioned with respect to registration surface 33. The embodiment of a non-contact measurement transducer illustrated in FIG. 1 is an eddy current probe. Eddy current probes are well known in the art, as are other examples of non-contact measurement transducers. The output of non-contact measurement transducer 35 is provided on cable 37 to a positioner 38. Positioner 38 responds to measurements from transducer 35 by repositioning shaft 39 along dimension 40 as illustrated by arrows 41.

Non-contact measurement transducer 35 measures the distance 45 between the transducer 35 and a surface 46 of the stack of disks 12. Positioner 38 repositions shaft 39 in the directions of arrows 41 so that the measurement of transducer 35 matches a predetermined value such that registration surface 33 is at registration line A with respect to the surface 46 of the stack of disks. With registration line A aligned with the stack of disks, registration surface 28 of the load/unload lift cams is also aligned at registration line A and therefore the load/unload lift cams 10 are aligned with the stack of disks 12.

Screws 23 and 24 are then tightened to clamp the load/unload lift cams 10 to the base plate wall 21 and thereby fix the registered load/unload lift cams 10 with respect to the stack of disks 12. Clamp 30 then releases the load/unload lift cams 10 and the tool is removed to allow the completion of manufacturing the disk drive.

Figure 2:
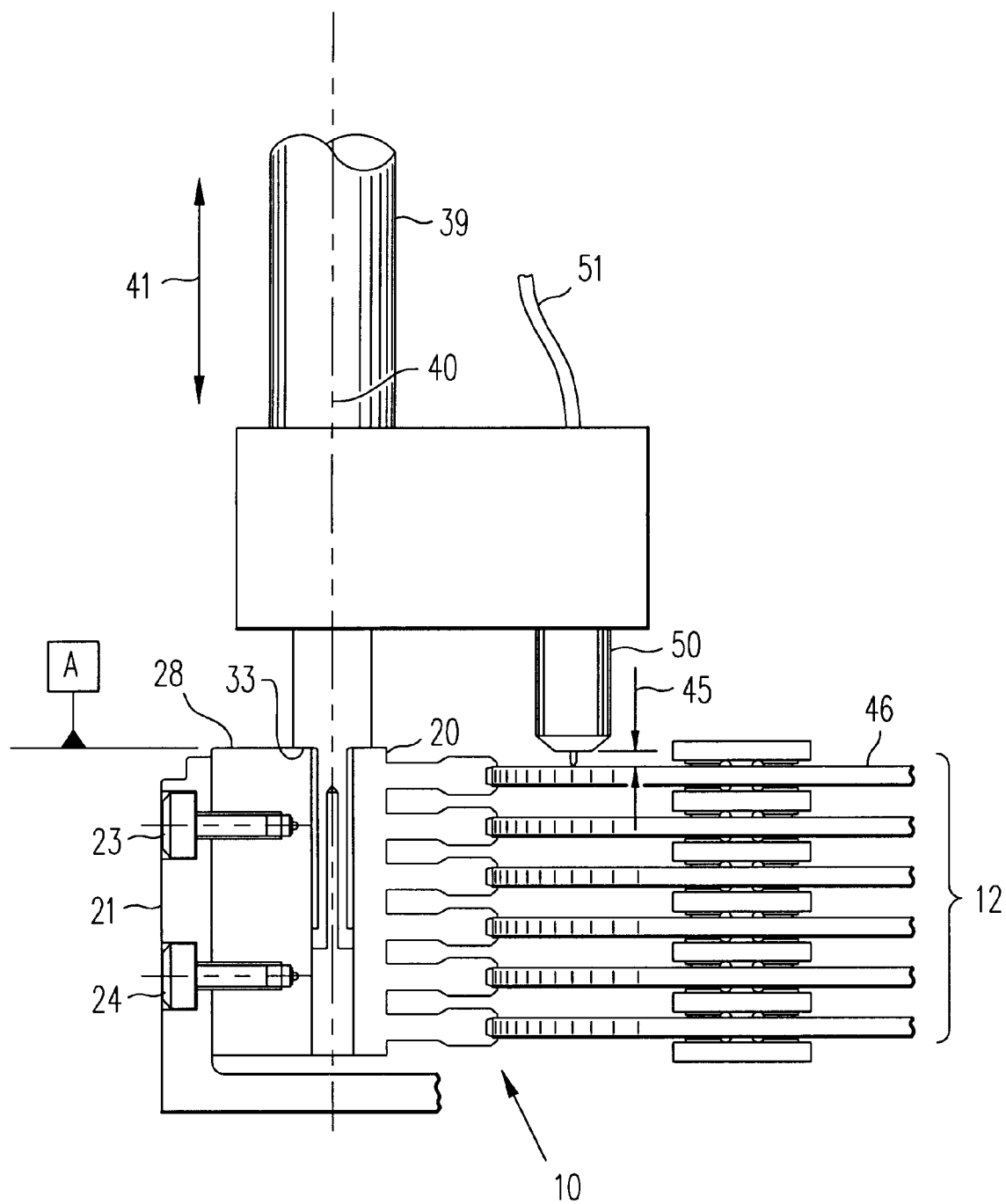
FIG. 2 is an illustration the load/unload lift cam arrangement of FIG. 1 and an alternative adjustment tool of the present invention.

FIG. 2 illustrates the high precision adjustable load/unload lift cam arrangement of FIG. 1, with an alternative embodiment of a non-contact transducer 50 for measuring the distance 45 between the transducer and surface 46 of the stack of disks 12. The illustrated embodiment of a non-contact transducer is a photoelectric sensor, which are known by, or available to those of skill in the art. An example is sensors offered by MTI (Mechanical Technology, Inc.). The measurements are provided to the positioner over cable 51.

As with respect to the embodiment described above, the positioner repositions shaft 39 in the directions of arrows 41 so that the measurement of transducer 35 matches a predetermined value such that registration surface 33 is at registration line A with respect to the surface 46 of the stack of disks. With registration line A aligned with the stack of disks, registration surface 28 of the load/unload lift cams is also aligned at registration line A and therefore the load/unload lift cams 10 are aligned with the stack of disks 12. Screws 23 and 24 are then tightened to clamp the carrier 20 of the load/unload lift cam 10 to the base plate wall 21 and thereby fix the registered load/unload lift cams 10 with respect to the stack of disks 12.

Figure 3A:
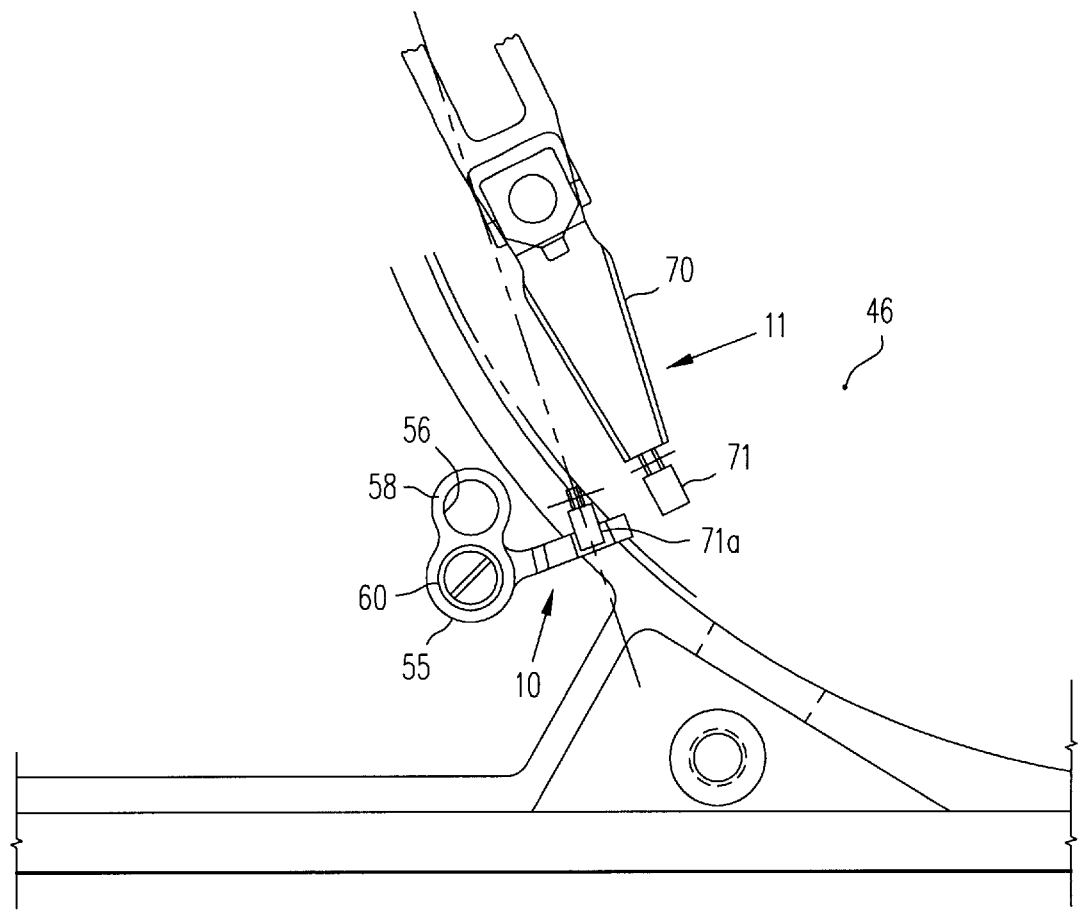
FIGS. 3a, 3b and 3c are top and side view illustrations of alternative load/unload lift cam arrangements of the present invention.
Figure 3B:
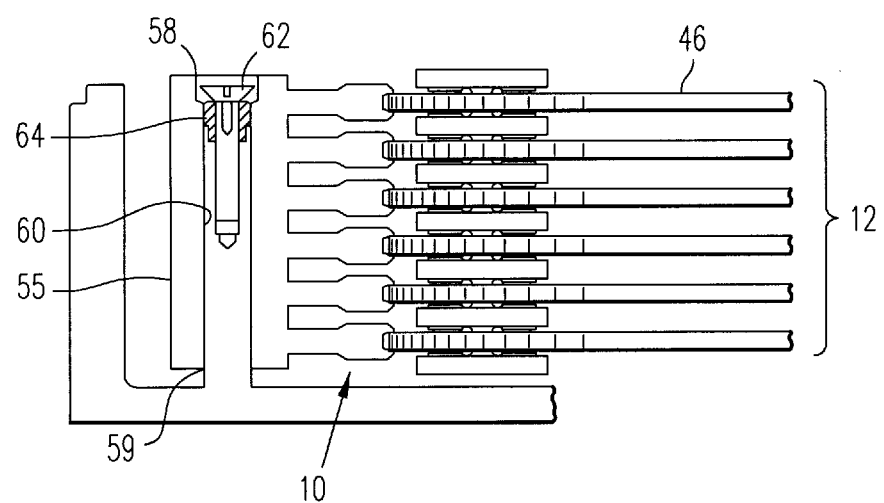

FIGS. 3a and 3b illustrate an alternative embodiment of a high precision adjustable load/unload lift cam arrangement in accordance with the present invention. A carrier 55 supports the set of load/unload lift cams 10, and may be formed in common with the Load/unload lift cams or assembled from separate parts. The alignment tools of FIG. 1 or of FIG. 2 may be utilized and the expandable clamp of the alignment tool inserted into hole 56 in carrier 55 for the load/unload lift cams 10 and the registration surface of the tool registered with registration surface 58 of the carrier 55. The positioner repositions carrier 55 vertically so the non-contact transducer measurement matches a predetermined value such that registration surface 58 is registered with respect to the surface 46 of the stack of disks 12, thereby registering the load/unload lift cams 10 with respect to the stack of disks.

A base plate base plate member or mounting post 59 is provided and may form part of the base plate for the disk drive, or may be fixedly attached to the disk drive base plate. A corresponding hole 60 is provided in carrier 55. The mounting post 59 and hole 60 allow vertical movement of carrier 55 and load/unload lift cams 10 as controlled by the alignment tool. A screw 62 and expandable collet 64 are inserted into hole 60 in carrier 55 and into a threaded hole in mounting post 59. Upon achieving registration of the load/unload lift cams 10 with respect to the stack of disks 12, screw 62 is tightened. Tightening of the screw 62 forces expanding collet 64 into contact with mounting post 59, causing the collet to expand sideways into the walls of hole 60, thereby causing an interference fit fixing carrier 55 and the load/unload lift cams 10 with respect to the stack of disks 12.

Figure 4:
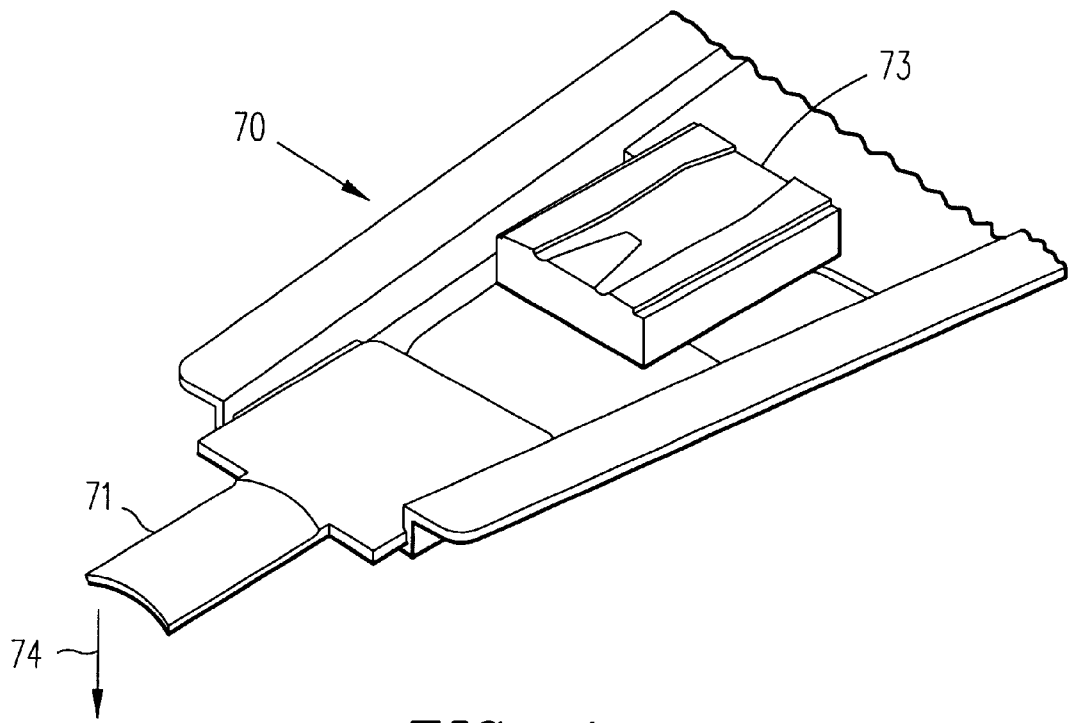
FIG. 4 is a perspective illustration of a head suspension assembly and load/unload lift cam follower usable with the load/unload lift cams of the present invention.

One head suspension assembly 70 and cam follower 71 of the set of head and suspension assemblies 11 of FIG. 1 is illustrated in FIG. 3a and is illustrated in FIG. 4 inverted from the position of FIG. 3a. Referring to FIG. 4, a head slider 73 is supported by the head suspension assembly 70 for recording data on a recording surface of a magnetic disk. Cam follower 71 is curved to allow the follower 71 to engage a camming surface or ramp of a load/unload lift cam 10. Referring additionally to FIG. 3a, cam follower 71 engages a ramp of cams 10 as the head suspension assembly 70 and cam follower is moved to position 71a, and the ramp forces the cam follower 71 and the head suspension assembly 70 and head slider 73 in the direction of arrow 74 to lift the head slider from the surface of the corresponding magnetic disk.

Figure 3C:
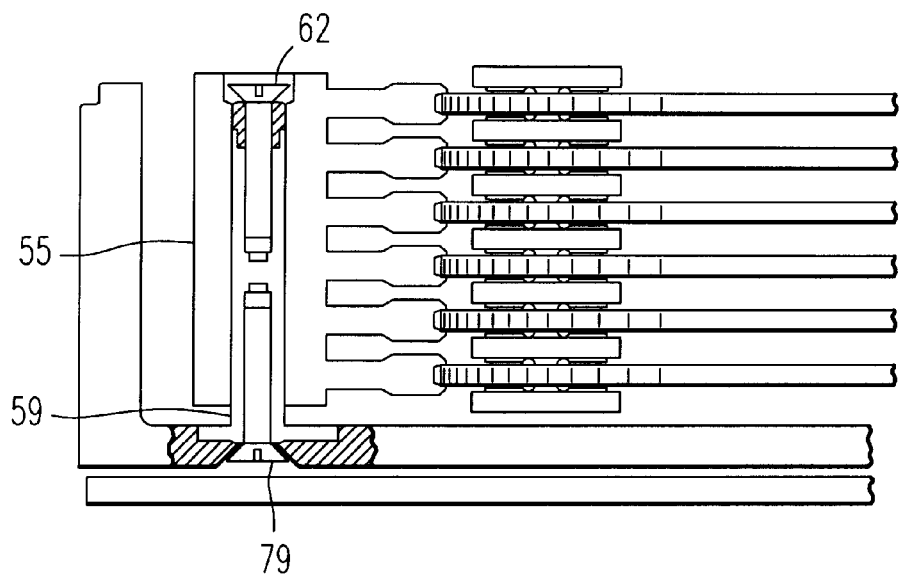

As noted earlier the mounting post 59 may be fixedly attached to the base plate. FIG. 3c illustrates one embodiment of attaching mounting post 59 to the base plate by means of screw 79. Such an embodiment allows for the insertion of the head suspension assemblies 11 into the disk stack after the actuator and disk stack have been installed into the base plate.

Such an embodiment, or variation of such embodiment, is needed for an assembly sequence in which the head suspension assemblies 11 are inserted into the stack of disks 12 by rotating the actuator after the actuator and the disk stack have been mounted into the base plate. For such as assembly sequence the actuator and head suspension assemblies (which are supported by the lift cams) are initially outside of the disk stack. The actuator is then rotated to insert the actuator arms partially into the disk stack. Simultaneously the lift cam carrier is moved to maintain support of the head suspension assemblies and move the lift cam tips over the outer edges of the disks.

Figure 5:
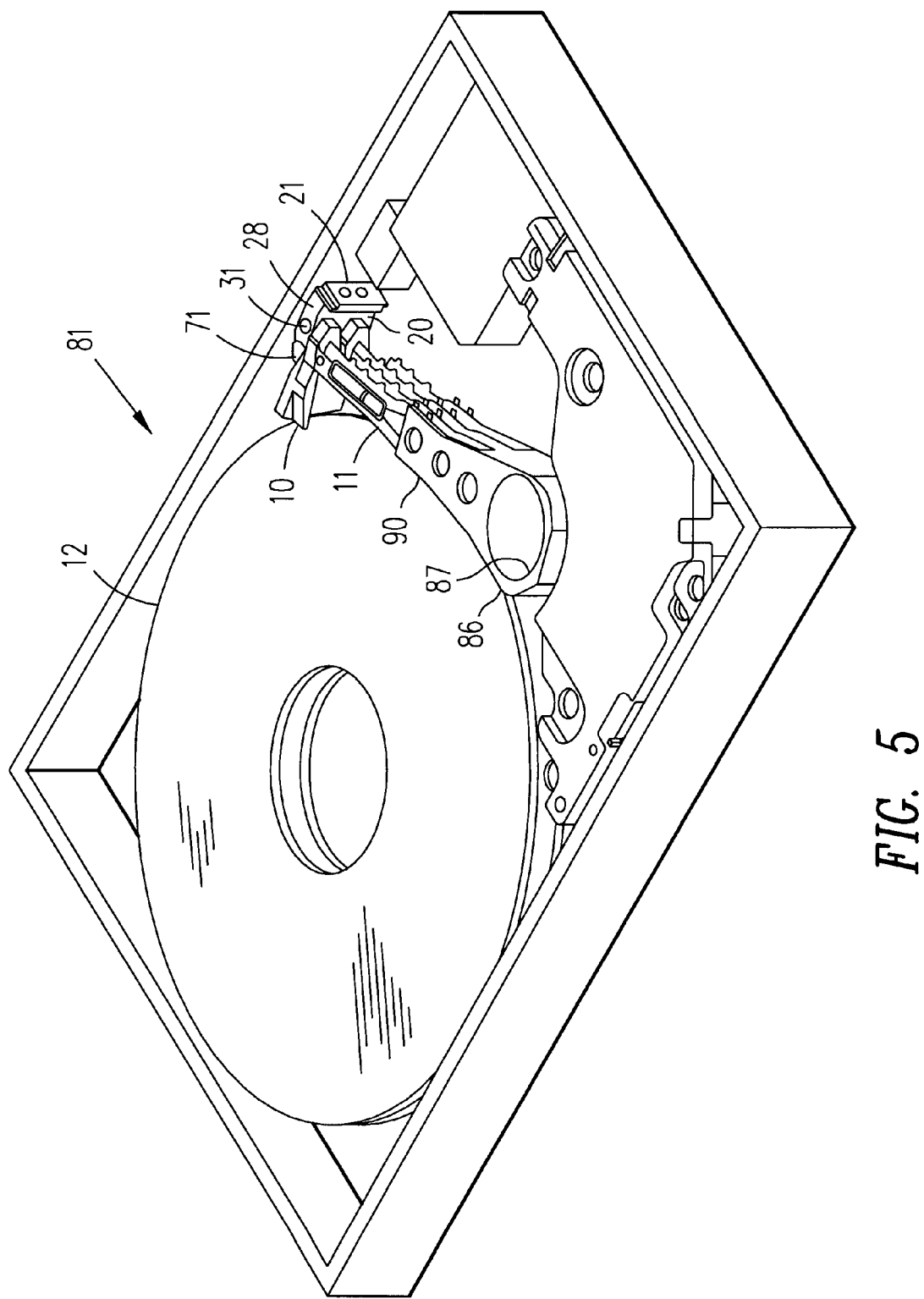
FIG. 5 is a perspective illustration of a disk file with load/unload lift cam arrangement of the present invention.

Referring to FIG. 5, an embodiment of a rigid disk drive 81 in accordance with the present invention is illustrated. The stack of magnetic recording disks 12 are supported for rotation by a suitable motor and spindle (not shown). A rotary actuator 86 is provided which rotates about a pivot axis 87. A suitable coil (not shown) is positioned within a permanent magnet core for rotating the actuator 86. A comb-like set of head arm assemblies 90 is secured to the actuator 86 and supports head suspension assemblies 11. A lift tab or cam follower 71 is provided at the end of each head suspension assembly and is moved up the ramp of a corresponding load/unload lift cam 10 to unload the head from the surface of the corresponding disk of disk stack 12.

In accordance with the present invention, the carrier 20 of the set of load/unload lift cams 10 is mounted on base plate member or wall 21. A hole 31 is provided in the load/unload lift cams carrier 20 into which an expandable clamp of the alignment tool is inserted sufficiently that the registration surface of the alignment tool registers with registration surface 28 of the carrier of the load/unload lift cams. Upon achieving alignment, carrier 20 is fixed to base plate member 21.

The method of the present invention may be employed to align each of a plurality of sets of load/unload lift cams, positioned in a vertical stack. The arrangement of the base plate member of FIG. 1 is particularly suited to stacked sets of load/unload cams.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method for adjusting the height of a set of load/unload lift cams with respect to the axial height of an associated stack of disks, comprising the steps of:

adjustably supporting and positioning said load/unload lift cams with an adjustment tool;

non-contact measuring the relative height of said supported load/unload lift cams with respect to said stack of disks in the axial direction of said stack of disks; and fixing said load/unload lift cams at a registered height with respect to said stack of disks measured in said non-contact measuring step and positioned in said adjustably supporting step.

2. The method for adjusting the height of a set of load/unload lift cams of claim 1, wherein:

said non-contact measuring step additionally comprises measuring the distance to said stack of disks from a fixed location at said adjustment tool.

3. The method for adjusting the height of a set of load/unload lift cams of claim 2, wherein:

said non-contact measuring step additionally comprises eddy current measurement of said distance to said stack of disks.

4. The method for adjusting the height of a set of load/unload lift cams of claim 2, wherein:

said non-contact measuring step additionally comprises photoelectric measurement of said distance to said stack of disks.

5. The method for adjusting the height of a set of load/unload lift cams of claim 1, wherein:

said fixing step additionally comprises tightening a clamping screw to clamp said set of load/unload lift cams in a fixed position with respect to said stack of disks.

6. A method for adjusting the height of each set of stacked sets of load/unload lift cams with respect to the axial height of an associated stack of disks, comprising the steps of:

adjustably supporting and positioning one of said sets of load/unload lift cams with an adjustment tool;

non-contact measuring the relative height of said one of said sets of supported load/unload lift cams with respect to said stack of disks in the axial direction of said stack of disks;

fixing said one of said sets of load/unload lift cams at a separate registered height with respect to said stack of disks measured in said non-contact measuring step and positioned in said adjustably supporting step; and repeating said steps for another of said stacked sets of load/unload lift cams.

7. The method for adjusting the height of each said set of stacked sets of load/unload lift cams of claim 6, wherein:

each said non-contact measuring step additionally comprises measuring the distance to said stack of disks from a fixed location at said adjustment tool.

8. The method for adjusting the height of each said set of stacked sets of load/unload lift cams of claim 7, wherein:

each said non-contact measuring step additionally comprises eddy current measurement of said distance to said stack of disks.

9. The method for adjusting the height of each said set of stacked sets of load/unload lift cams of claim 7, wherein:

each said non-contact measuring step additionally comprises photoelectric measurement of said distance to said stack of disks.

10. The method for adjusting the height of each said set of stacked sets of load/unload lift cams of claim 6, wherein:

each said fixing step additionally comprises tightening at least one clamping screw to clamp said set of load/unload lift cams in a fixed position with respect to said stack of disks.

* * * * *